United States Patent
Ito et al.

(10) Patent No.: US 10,859,088 B2
(45) Date of Patent: Dec. 8, 2020

(54) SLIDING MATERIAL, SHAFT SLEEVE, AND PUMP PROVIDED WITH SHAFT SLEEVE

(71) Applicants: EBARA CORPORATION, Tokyo (JP); NIPPON TUNGSTEN CO., LTD., Fukuoka (JP)

(72) Inventors: Nobuaki Ito, Tokyo (JP); Kenichi Sugiyama, Tokyo (JP); Hiroshi Yakuwa, Tokyo (JP); Norio Takahashi, Tokyo (JP); Makoto Komiya, Tokyo (JP); Kenji Fujimoto, Fukuoka (JP)

(73) Assignees: EBARA CORPORATION, Tokyo (JP); NIPPON TUNGSTEN CO., LTD., Fukuoka (JP)

( * ) Notice: Subject to any disclaimer, the term of this patent is extended or adjusted under 35 U.S.C. 154(b) by 244 days.

(21) Appl. No.: 16/082,112

(22) PCT Filed: Feb. 23, 2017

(86) PCT No.: PCT/JP2017/006735
§ 371 (c)(1),
(2) Date: Sep. 4, 2018

(87) PCT Pub. No.: WO2017/154587
PCT Pub. Date: Sep. 14, 2017

(65) Prior Publication Data
US 2019/0113047 A1    Apr. 18, 2019

(30) Foreign Application Priority Data
Mar. 7, 2016    (JP) .................................. 2016-043517

(51) Int. Cl.
*F04D 29/046* (2006.01)
*C22C 29/10* (2006.01)
(Continued)

(52) U.S. Cl.
CPC ............ *F04D 29/046* (2013.01); *C22C 29/02* (2013.01); *C22C 29/10* (2013.01); *F04D 29/026* (2013.01); *F16C 33/12* (2013.01)

(58) Field of Classification Search
CPC .... B22F 5/00; B22F 5/008; B22F 5/02; B22F 5/06; B22F 5/08; B22F 5/085;
(Continued)

(56) References Cited

U.S. PATENT DOCUMENTS 5,534,353 A  *  7/1996  Kaba .................... C22C 32/0052
                                                                    428/546
5,545,248 A       8/1996  Tokumoto et al.

FOREIGN PATENT DOCUMENTS

JP     05140692 A  *  6/1993
JP    H06-73486 A      3/1994
(Continued)

OTHER PUBLICATIONS

International Search Report issued in Patent Application No. PCT/JP2017/006735 dated May 16, 2017.
(Continued)

*Primary Examiner* — Vanessa T. Luk
(74) *Attorney, Agent, or Firm* — Pearne & Gordon LLP (57) ABSTRACT

Provided is a $TiC_x$—(Ti—Mo) sliding material having a binder phase made of a Ti—Mo alloy, and a hard phase containing $TiC_x$, wherein the $TiC_x$—(Ti—Mo) sliding material satisfies all the following conditions: (1) a total area of the binder phase and the hard phase is 90% or more of an area of a field of view; (2) a total area of the binder phase is 15% or more and 20% or less of the area of the field of view; (3) in the binder phase, a total area of the binder phase having a diameter equivalent to 10 μm or more and 50 μm or less; (4) in the binder phase, a total area of the binder phase having a diameter equivalent to less than 10 μm; and
(Continued)

(5) a Mo concentration in the binder phase is 25 wt % or more and 35 wt % or less.

4 Claims, 4 Drawing Sheets

(51) Int. Cl.
*F16C 33/12* (2006.01)
*C22C 29/02* (2006.01)
*F04D 29/02* (2006.01)

(58) Field of Classification Search
CPC ............ B22F 5/106; B22F 2005/001; B22F 2005/002; B22F 2005/004; B22F 2005/005; B22F 2301/205; B22F 2302/10; C22C 1/0458; C22C 1/05; C22C 1/051; C22C 1/053; C22C 1/055; C22C 1/056; C22C 1/058; C22C 1/068; C22C 14/00; C22C 29/00; C22C 29/005; C22C 29/02; C22C 29/06; C22C 29/067; C22C 29/10; C22C 32/00; C22C 32/0005; C22C 32/0047; C22C 32/0052

See application file for complete search history.

(56) References Cited

FOREIGN PATENT DOCUMENTS

| JP | 2000-161361 A | | 6/2000 |
|---|---|---|---|
| JP | 2003-129166 A | | 5/2003 |
| JP | 2004-190097 A | | 7/2004 |
| JP | 2004190097 A | * | 7/2004 |

OTHER PUBLICATIONS

Written Opinion issued in Patent Application No. PCT/JP2017/006735 dated May 16, 2017.

* cited by examiner

SLIDING MATERIAL, SHAFT SLEEVE, AND PUMP PROVIDED WITH SHAFT SLEEVE

TECHNICAL FIELD

The present invention relates to a shaft sleeve used for a pump and the like and a sliding material of the shaft sleeve, and more particularly, to a shaft sleeve used in an environment where the shaft sleeve is exposed to corrosive fluids such as seawater and sewage, and a pump using the shaft sleeve.

BACKGROUND ART

A rotating shaft is provided in a pump to transfer torque from a driving machine such as a motor for rotating an impeller to the impeller. The impeller in the pump is surrounded by a casing and is exposed to water as it conveys the water. The rotating shaft is mostly connected from outside the casing to the impeller inside the casing, and thus part of the rotating shaft is exposed to water. Further, the rotating shaft is supported by a bearing such as a sliding bearing which receives a force acting in a rotational direction of the rotating shaft. The sliding bearing for most of the pumps is provided under water.

The rotating shaft slides at the part of which the sliding bearing is provided and thus becomes significantly worn if a rotational speed is high or hard sand or the like gets mixed into water. In such a case, a cylindrical member called a sleeve made of a material having more excellent wear resistance than that of the rotating shaft is in some cases provided around an outer periphery of the rotating shaft that slides with the sliding bearing. A position and the number of the sliding bearing provided depend on a condition such as a length of the rotating shaft, a weight of a rotating body, and a rotational speed.

In general, the higher the hardness of the material, the more excellent wear resistance of the material. Therefore, as a material used for the sleeve, a cemented carbide material having excellent wear resistance wherein ceramic particles such as WC (tungsten carbide) are dispersed in a base metal such as Co and Ni is used, for example.

However, a sleeve incorporated in the pump for handling corrosive fluids such as seawater and sewage is required to have not only wear resistance, but also corrosion resistance. As a material having excellent wear resistance and corrosion resistance, a sleeve having a binder phase made of a Ti—Mo alloy and a hard phase containing TiC has been proposed.

According to PTL 1, when a conventional material wherein ceramic particles such as WC (tungsten carbide) are dispersed in a base metal such as Co and Ni is used, there has been a problem in which strength and wear resistance of the sleeve cannot be maintained as Co and Ni are eluted due to corrosion and thus WC (tungsten carbide) falls out of the material. Therefore, a sleeve composed of a cemented carbide material having a binder phase made of a Ti—Mo eutectic alloy in which TiC particles are uniformly dispersed has been proposed for a purpose of solving the above problem. Regarding the Ti—Mo eutectic alloy, PTL 1 states that: the alloy itself has excellent corrosion resistance; hardness is improved by finely dispersing an α-Ti phase and a β-TiMo phase; and corrosion caused by contacting different kinds of metals can be prevented.

In PTL 2, it has been proposed that a sleeve is composed of a cermet of a sintered body, which is a cemented carbide material having TiC particles uniformly dispersed in a binder phase of a Ti—Mo alloy and having a TiC content of 90 wt % to 70 wt % as a hard phase and a Ti—Mo eutectic alloy content of 10 wt % to 30 wt %.

According to proposals made in these literatures, it is suggested that wear resistance as well as corrosion resistance, sliding resistance, and anti-galling performance are improved.

However, according to PTL 3 describing in regard to a Ti—Mo—TiC sintered alloy, C in TiC is interdiffused in Ti side and Mo side during sintering, and a TiC phase specifically $TiC_{0.5}$ phase and a Ti—Mo alloy phase (β-Ti phase) are produced after sintering. It is also stated that, for example, when a large amount of coarse Ti raw material powder having a particle size of 45 μm or less is contained in a Ti—Mo—TiC sintered alloy, C is further diffused and significant particle growth in the $TiC_x$ phase occurs during a process in which $TiC_{1.0}$ changes to $TiC_{0.5}$. For that reason, it is stated that such a Ti—Mo—TiC sintered alloy has reduced hardness and strength. It is further stated that, production of a Ti—Mo—TiC sintered alloy using fine Ti powder is extremely difficult as Ti is active, and the produced Ti—Mo—TiC sintered alloy cannot be used in industrial applications since physical properties deteriorate significantly according to a dissolved oxygen content or nitrogen content.

It is noted that a sleeve composed of a cemented carbide material is easily broken when a force of impact during the rotation is applied. Especially, the faster the rotational speed is or the more the foreign objects get into the sliding part, the more easily the force of impact is produced, which often leads to a breakage of the sleeve. Further, when the foreign objects get into the sliding part located between the sleeve and the sliding bearing while they slide relative to each other, the foreign objects come into contact with a sleeve surface and leave a scratch. This scratch causes a formation of a crack and therefore reduces strength of the sleeve. Consequently, the sleeve is more easily broken.

In recent years, there has been a demand for a pump capable of pumping a large amount of water with a higher lifting height in water pumping and discharging facilities, and thus the rotating shaft has been becoming thicker and longer and the rotational speed has been becoming faster. Further, as a result of climate change in recent years, a large amount of earth and sand and gravel have been carried to rivers and the sea or lifted from the bottom of rivers or the bottom of the sea due to heavy rains and floods, which has resulted in a situation where those earth and sand and gravel have been getting mixed into water to be pumped up.

Accordingly, the environment requiring use a sleeve of the pump imposes increasingly severe conditions in which the sleeve is more easily broken than ever. Thus, the sleeve is expected to have ability to withstand such a condition, that is, the sleeve is expected to be made of a material having a fracture toughness value higher than that of existing materials. Note that "toughness" refers to power of resistance involved in an early developing stage to a developing stage of the crack, and "fracture toughness value" is an index of the power of resistance.

Figure 1:
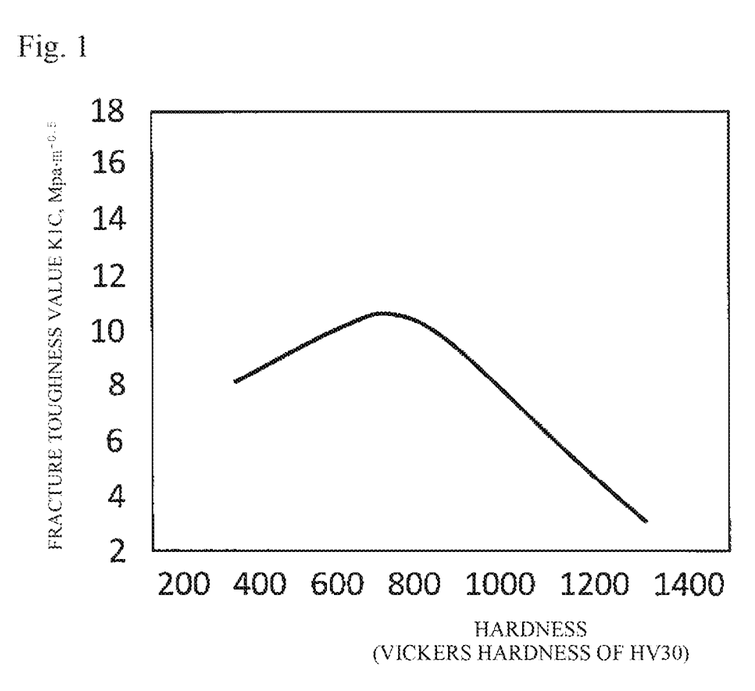
FIG. 1 is a graph showing a relationship between hardness and a fracture toughness value of a material.

In a material with strong corrosion resistance and wear resistance having a binder phase made of a Ti—Mo alloy and a hard phase containing TiC, hardness and fracture toughness of that material are not linearly correlated and the hardness has a point where the fracture toughness becomes maximum. For example, as shown in FIG. 1, as the hardness increases, the fracture toughness also increases until the hardness reaches 800 N based on Vickers hardness of HV30 (30 kgf). However, the fracture toughness becomes maximum when the hardness is 800 N. When the hardness is more than 800 N, the fracture toughness tends to decrease as the hardness increases. However, since a wear volume increases as the hardness decreases, a material having such a characteristic is not suitable for a sliding member. Therefore, there has been a demand for a sliding material having a low wear volume, high hardness, and high fracture toughness.

CITATION LIST

Patent Literature

PTL 1: Japanese Patent Laid-Open No. 2000-161361
PTL 2: Japanese Patent Laid-Open No. 2003-129166
PTL 3: Japanese Patent Laid-Open No. 2004-190097

SUMMARY OF INVENTION

Technical Problem

An object of the present invention is to provide: a sliding material having a binder phase made of a Ti—Mo alloy and a hard phase containing TiC, which has excellent wear resistance, hardness, and high fracture toughness; a sleeve composed of the sliding material, which has excellent corrosion resistance, wear resistance, and resistance to breakage; and a pump incorporating the sleeve.

Solution to Problem

The present invention provides a TiC—(Ti—Mo) sliding material having a binder phase made of a Ti—Mo alloy, and a hard phase containing $TiC_x$ where x is in a range of 0.5 to 0.7, wherein in a backscattered electron image by a scanning electron microscope (SEM) at a magnification of 400 times of the TiC—(Ti—Mo) sliding material in a field of view of 317 μm×220 μm, which are values converted from the number of pixels of the field of view (hereinafter, abbreviated as an "SEM observation field of view"), the TiC—(Ti—Mo) sliding material satisfies all the following conditions (1) to (5):

(1) a total area of the binder phase and the hard phase is 90% or more of an area of the SEM observation field of view;

(2) a total area of the binder phase is 15% or more and 20% or less of an area of the SEM observation field of view;

(3) in the binder phase, a total area of the binder phase having a diameter equivalent to 10 μm or more and 50 μm or less calculated on an assumption that an area of the binder phase has a circular shape is 60% or more and 80% or less of the total area of the binder phase;

(4) in the binder phase, a total area of the binder phase having a diameter equivalent to less than 10 μm calculated on an assumption that an area of the binder phase has a circular shape is 20% or more and 40% or less of the total area of the binder phase; and (5) a Mo concentration in the binder phase is 25 wt % or more and 35 wt % or less.

The TiC—(Ti—Mo) sliding material preferably includes 80 mass % to 90 mass % of TiC and 10 mass % to 20 mass % of a Ti—Mo alloy.

Calculation steps of an area ratio by the scanning electron microscope (hereinafter, abbreviated as an "SEM") observation are as follows.

The backscattered electron image of a test piece by the SEM at an observing magnification of 400 times is observed and image analysis is conducted on the field of view (317 μm×220 μm). In the SEM image, regions displayed in white are a metal phase or an alloy phase, and regions displayed in black are a carbide phase. An area of each region displayed in white is determined by binarization processing, and a diameter of the area is calculated on an assumption that the area has a circular shape. A total area of the regions having a diameter equivalent to 10 μm or more and 50 μm or less, a total area of the regions having a diameter equivalent to less than 10 μm, and a total area of the regions having a diameter equivalent to more than 50 μm are determined, and a ratio of the total area of the regions displayed in white to the total area of each region is calculated. At least 5 SEM observation fields of view are selected and their average value is determined as an area ratio.

As for the Mo concentration in the binder phase, point analysis is conducted on at least any 10 points selected from any binder phase in the SEM observation field of view using an energy-dispersive X-ray spectrometry (EDX), and their average value is determined as the Mo concentration.

The sliding material of the present invention may further include a third phase different from the binder phase, the hard phase, the Ti phase, and the Mo phase, in an amount of less than 10% of an area of the SEM observation field of view. Examples of the third phase preferably include: a mutual solid solution of two or more of metallic elements selected from the group 5 metallic element, the group 6 metallic element listed in the periodic table of the elements and Ti, except for Ti—Mo; or a carbide, a nitride, and a carbonitride of one or more of metallic elements selected from the group 5 metallic element, the group 6 metallic element listed in the periodic table of the elements and Ti, except for TiC; and a combination of those mentioned above. The presence of the third phase causes a relative decrease in a total amount of the binder phase and the hard phase, which lowers the strength of a two-phase alloy including the Ti—Mo phase and the $TiC_x$ phase and thus reduces the deflective strength. Accordingly, a content of the third phase is preferably low.

According to the present invention, a sleeve made of the TiC—(Ti—Mo) sliding material is also provided. The sleeve of the present invention is provided between a rotating shaft of a rotating machine and a sliding bearing supporting the rotating shaft while sliding.

Further, according to the present invention, a pump incorporating a sleeve made of the TiC—(Ti—Mo) sliding material is provided. The pump of the present invention includes: an impeller; a rotating shaft for rotating the impeller; a casing for fixing a sliding bearing supporting the rotating shaft while sliding, the casing surrounding the impeller and the rotating shaft; and the sleeve in a cylindrical form provided on a sliding face of the sliding bearing of the rotating shaft.

Advantageous Effects of Invention

The sliding material of the present invention has excellent wear resistance while having high hardness, and has high fracture toughness.

The sleeve of the present invention has excellent corrosion resistance, wear resistance, and resistance to breakage.

DESCRIPTION OF EMBODIMENTS

Hereinafter, the present invention is described in detail with reference to the accompanying drawings. However, the present invention is not limited to these embodiments.

Figure 2:
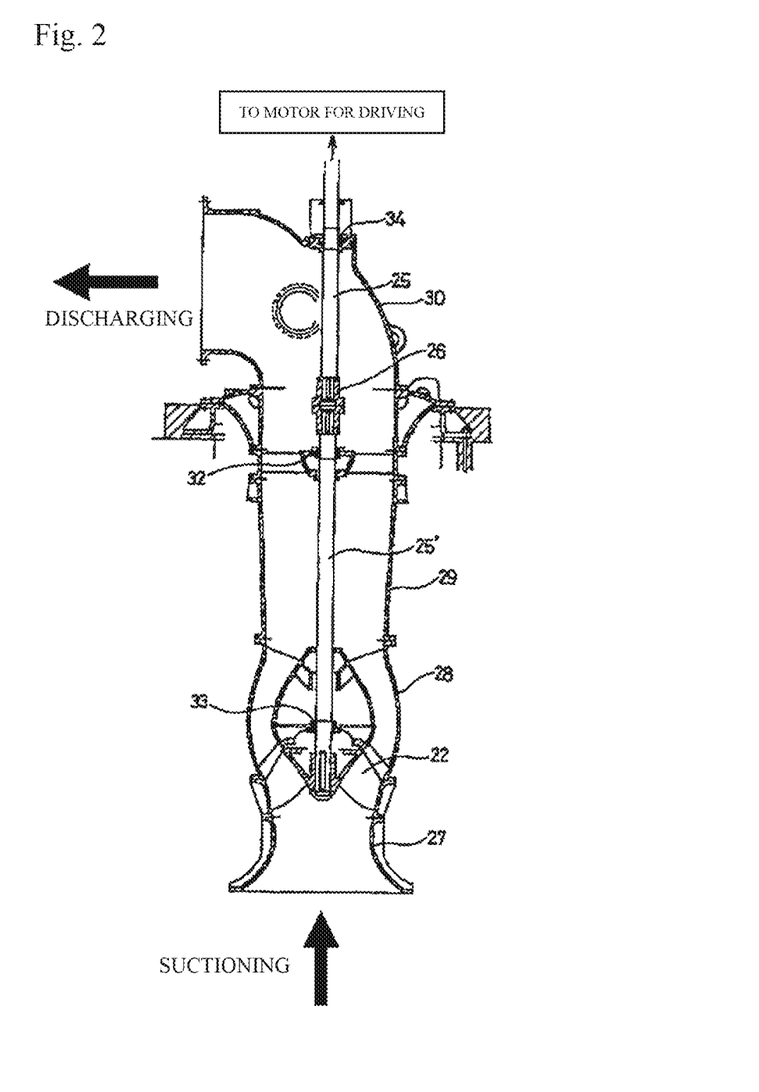
FIG. 2 is a sectional view of one embodiment of a pump according to the present invention.

FIG. 2 is a sectional view showing an entirety of a vertical shaft pump 3. As shown in FIG. 2, the vertical shaft pump 3 includes a discharge elbow 30 provided and fixed to an installation floor for the pump, a casing 29 connected to a lower end of the discharge elbow 30, a discharge bowl 28 which is connected to a lower end of the casing 29 and houses an impeller 22 inside, and a suction bell 27 which is connected to a lower end of the discharge bowl 28 and suctions water.

Through a radially approximately central part of the casing 29, the discharge bowl 28, and the suction bell 27 of the vertical shaft pump 3, one rotating shaft 10 formed by two shafts including top and bottom shafts that are connected with each other by a shaft coupling 26 is provided.

The rotating shaft 10 is supported by an upper bearing 32 fixed to the casing 29 via a supporting member and a lower bearing 33 fixed to the discharge bowl 28 via a supporting member. The impeller 22 for suctioning water into the pump is connected to one end side (suction bell 27 side) of the rotating shaft 10. The other end side of the rotating shaft 10 extends outside the vertical shaft pump 3 through a hole provided in the discharge elbow 30 and is connected to a driving machine, which is not shown in the drawing, such as an engine and a motor for rotating the impeller 22.

A shaft seal 34 such as a floating seal, a gland packing, and a mechanical seal is provided between the rotating shaft 10 and the hole provided in the discharge elbow 30. This shaft seal 34 prevents water handled by the vertical shaft pump 3 from flowing out of the vertical shaft pump 3.

The driving machine is provided on land so that a maintenance check can be easily performed. The rotation of the driving machine is transferred to the rotating shaft 10, enabling the impeller 22 to rotate. As the impeller 22 rotates, water is suctioned from the suction bell 27 and discharged from the discharge elbow 30 through the discharge bowl 28 and the casing 29.

Figure 3:
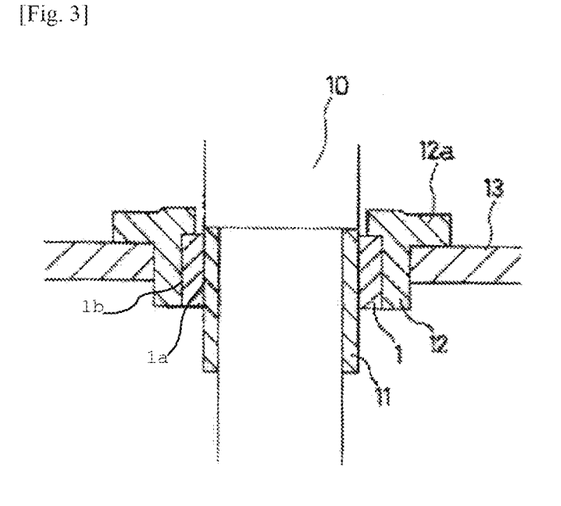
FIG. 3 is a sectional view of one embodiment of a bearing system according to the present invention.

FIG. 3 is an enlarged view of a bearing system applied to the bearings 32 and 33 shown in FIG. 2. As shown in FIG. 3, the bearing system has a sleeve 11 composed of the sliding material of the present invention around an outer periphery of the rotating shaft 10.

A sliding bearing 1 made of ceramics in a form of a hollow cylinder is provided on the outer periphery side of the sleeve 11. The outer periphery surface of the sleeve 11 is structured in such a manner as to face an inner periphery surface (sliding face) of the sliding bearing 1 via a very narrow clearance and to slide relative to the sliding bearing 1. The sliding bearing 1 is fixed to a supporting member 13 which leads to the casing 29 of the pump (see FIG. 2) via a flange part 12a of a bearing case 12 made of a metal or a resin. The sliding bearing 1 is in a form of a hollow cylinder, and an inner periphery surface 1a faces the outer periphery surface of the sleeve 11 and an outer periphery surface 1b is fit with the bearing case 12.

The vertical shaft pump 3 shown in FIG. 2 is operated in air at the time of starting the pumping operation. That is, the bearings 32 and 33 are operated in a dry condition without lubrication with liquid. The dry condition herein refers to a condition in which atmosphere for the bearings 32 and 33 during the pumping operation is air where no lubrication with liquid is present, and a dry operation refers to an operation performed in that condition. The bearings shown in FIG. 3 are also operated in a water-discharging condition in which water flows through the bearings. The water-discharging condition herein refers to a condition in which atmosphere for the bearings 32 and 33 during the pumping operation is water with foreign objects (slurry) such as earth and sand mixed in, and a water-discharging operation is an operation performed in that condition. The bearings 32 and 33 are used in such conditions.

EXAMPLES

Example 1

Commercially available $TiC_x$ (x=0.5 to 0.9, average particle size: 1.0 μm), Ti powder (particle size: <45 μm), Mo powder (average particle size: 4.2 μm), and $TaC_y$ (y=1, average particle size: 1.0 μm) were blended in a proportion prescribed for each material and then mixed in a mortar machine or a Henschel mixer for 1 hour to 2 hours. A resultant mixture of powder was press-molded at 1000 kgf/cm² to 2000 kgf/cm², which was then sintered at 1250° C. to 1500° C. for 2 hours under a vacuum or a reduced pressure atmosphere of inert gas such as nitrogen or argon. Using the above-described production method, a plurality of samples, which differ from each other in terms of a ratio of the binder phase (bonding phase) and the hard phase, an amount of Mo present in the binder phase, a size of the binder phase, and a percentage of the third phase, were produced by changing a blend ratio of $TiC_x$, Ti, Mo, and $TaC_y$ and a temperature.

Production conditions of each sample are shown in Table 1.

[Table 1]

TABLE 1

| | Production conditions | | | | | | |
|---|---|---|---|---|---|---|---|
| Sample No. | $TiC_x$ mass % | Ti mass % | Mo mass % | $TaC_y$ mass % | Mixing time Hr | Molding pressure MPa | Sintering temperature ° C. |
| E1 | 85 | 10 | 5 | — | 2 | 98 | 1300 |
| E2 | 85 | 10 | 5 | — | 2 | 98 | 1300 |
| E3 | 86.5 | 10 | 3.5 | — | 2 | 98 | 1300 |
| E4 | 90 | 5 | 5 | — | 2 | 98 | 1300 |
| E5 | 80 | 15 | 5 | — | 2 | 98 | 1300 |

TABLE 1-continued

| | Production conditions | | | | | | |
|---|---|---|---|---|---|---|---|
| Sample No. | TiC$_x$ mass % | Ti mass % | Mo mass % | TaC$_y$ mass % | Mixing time Hr | Molding pressure MPa | Sintering temperature ° C. |
| E6 | 82.5 | 10 | 7.5 | — | 2 | 98 | 1300 |
| E7 | 78 | 10 | 5 | 7.0 | 2 | 98 | 1300 |
| C1 | 85 | 0 | 5 | 10.0 | 2 | 98 | 1300 |
| C2 | 91.5 | 5 | 3.5 | — | 2 | 98 | 1300 |
| C3 | 77.5 | 15 | 7.5 | — | 2 | 98 | 1300 |
| C4 | 84 | 12.5 | 3.5 | — | 2 | 98 | 1300 |
| C5 | 85 | 7.5 | 7.5 | — | 2 | 98 | 1300 |
| C6 | 85 | 10 | 5 | — | 2 | 98 | 1250 |
| C7 | 85 | 10 | 5 | — | 1 | 98 | 1500 |
| C8 | 85 | 10 | 5 | — | 1 | 98 | 1400 |

The produced samples were assessed in regard to the following categories.

[Wear Volume]

Each sample was molded into a form of a sleeve having an outer diameter of 65 mm, which was placed under water having a foreign object concentration of 300 mg/L, applied a bearing surface pressure of 0.12 MPa, and then rotated for 8 hours at a sliding velocity on a sliding surface of 5.0 m/sec. A wear volume was subsequently measured by a wear test. As for the foreign objects, silica sand (main component: SiO$_2$) having an average particle size of 5 μm and silica sand having an average particle size of 30 μm mixed at a ratio of 1:1 were used. The wear volume was measured with a stylus type surface profilometer.

Based on the results of the wear test, a development rate of wearing depth of 2 μm/h or less was determined as "○" and that of more than 2 μm/h was determined as "×."

[Deflective Strength]

A test piece having a predetermined dimension (25×8×4 mm) was prepared for each sample in accordance with the JIS H5501 Cemented Carbide Tool Industrial Standards (CIS026B), and deflective strength of the test piece was measured by a three-point bending test.

The deflective strength of 0.5 GPa or more was determined as "○" and that of less than 0.5 GPa was determined as "×." The deflective strength of less than 0.5 GPa is not preferable as a material having such strength is easily broken.

[Fracture Toughness]

Using an IF method (Indentation Fracture method), fracture toughness was determined from a size of a crack and a size of an indentation (Vickers indentation) produced when an indenter was pressed against the sample (10 mm×10 mm×5 mm). An assessment formula is based on the formula of Evans.

A fracture toughness value of 9 MPa·m$^{0.5}$ or more was determined as "○" and that of less than 9 MPa·m$^{0.5}$ was determined as "×." The fracture toughness value of less than 9 MPa·m$^{0.5}$ is not preferable as a material having the fracture toughness of such a value is easily broken.

[Corrosion Resistance]

Corrosion resistance was assessed based on current density of a potentiostatic polarization test. The potentiostatic polarization test was performed on the test piece at +0.441 V $_{vs}$ SSE for 72 hours in artificial seawater at 25° C. using platinum as a counter electrode and a silver-silver chloride electrode as a reference electrode.

The current density of 1.0×10$^{-3}$ mA/cm$^2$ or less determined as "○" and that of more than 1.0×10$^{-3}$ mA/cm$^2$ was determined as "×." When the current density is more than 1.0×10$^{-3}$ mA/cm$^2$, a material is significantly damaged due to corrosion.

[Hardness]

Hardness was measured using the Vickers indentation method by applying a load of 30 kgf.

[Ti—Mo Phase Area]

Figure 4:
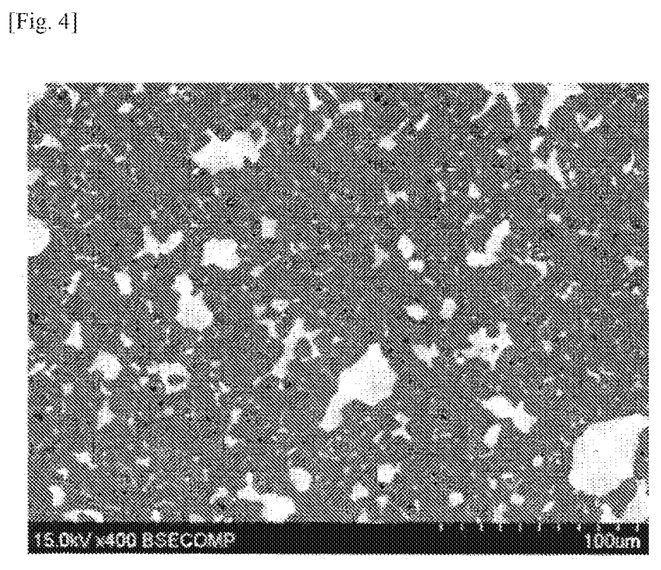
FIG. 4 is an SEM image of sample No. E1.
Figure 5:
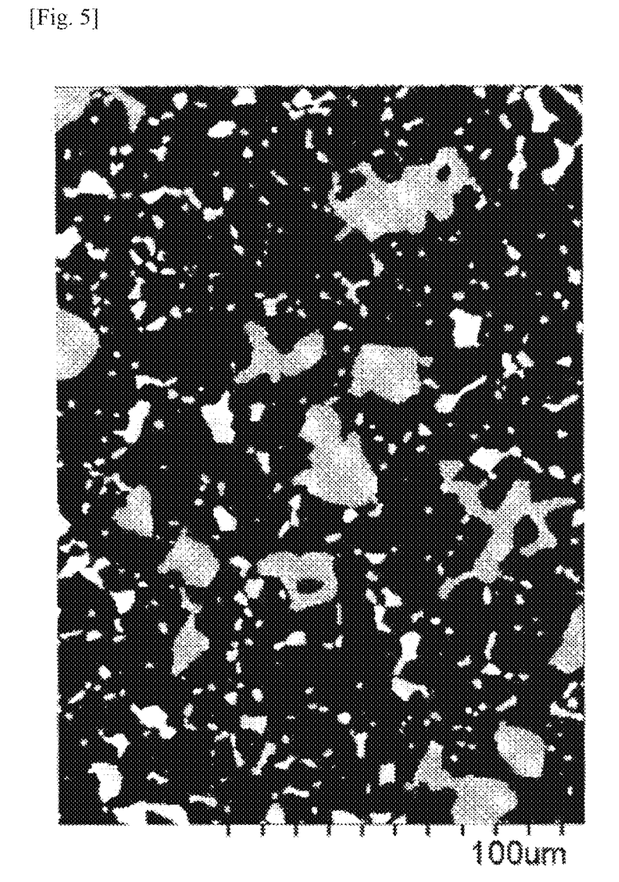
FIG. 5 is a binarized image of a left half region of the SEM image of FIG. 4.

Each sample was cut into a test piece, and a backscattered electron image by SEM at an observing magnification of 400 times of the test piece was observed. Image analysis was conducted on a field of view (317 μm×220 μm which were converted from the number of pixels of the image by the SEM observation). FIG. 4 is the SEM image of sample No. E1, and FIG. 5 is the image of which binarization processing was performed on a left half region of the SEM image of FIG. 4 for the image analysis. Tiny black dots in FIG. 4 are residual pores. In the SEM image for the image analysis shown in FIG. 5, regions displayed in white are a metal phase or an alloy phase, and regions displayed in black are non-metallic phase such as a carbide phase, a nitride phase, and a carbonitride phase. The area of each region displayed in white was determined to calculate a diameter on an assumption that the area has a circular shape. A total area of the regions having a diameter equivalent to 10 μm or more and 50 μm or less (gray regions where white regions are shaded as shown in FIG. 5), a total area of regions having a diameter equivalent to less than 10 μm (white regions as shown in FIG. 5), and a total area of regions having a diameter equivalent to more than 50 μm were determined to calculate a ratio of the total area of each region to the total area of regions displayed in white. Five SEM observation fields of view were selected and their average value was determined as an area ratio.

[Mo Concentration in Ti—Mo Phase]

After the SEM observation, any white region in the SEM observation field of view of the test piece was selected, and point analysis was conducted with an energy-dispersive X-ray spectrometry (hereinafter, abbreviated as "EDX") to analyze a Mo concentration. Ten analysis points were selected and their average value was determined as the Mo concentration.

[Area of Third Phase]

A third phase cannot be confirmed in FIG. 5. Since a difference in chromaticity and brightness based on a density difference of each phase can be observed in the backscattered electron image of the SEM, a phase other than the Ti—Mo phase and the TiC phase can be confirmed and its area ratio can be determined by the image analysis. The assessment results are shown in Table 2 below. Since Ti is dispersed into the TiC$_x$ phase due to mixture of TiC$_x$ with Ti powder and Mo powder and sintering, a relative amount of C in the TiC$_x$ phase is reduced and consequently x is fallen into a range of 0.5 to 0.7 as x cannot be maintained within the range of 0.5 to 0.9.

[Table 2]

that the area of the Ti—Mo phase has a circular shape was 30%. That is, when requirement (3) in which "in the binder phase, a total area of the binder phase having a diameter equivalent to 10 μm or more and 50 μm or less calculated on an assumption that an area of the binder phase has a circular

TABLE 2

Assessment results

| Sample No. | Wear volume | Deflective strength | Fracture toughness | Corrosion resistance | HV (30 kgf) Vickers hardness N | Area ratio of TiMo phase sq % | Mo concentration in TiMo phase wt % | Area ratio by diameters of TiMo phase | | | Third phase sq % | Overall judgment |
|---|---|---|---|---|---|---|---|---|---|---|---|---|
| | | | | | | | | >50 μm sq % | 50-10 μm sq % | 10 μm > sq % | | |
| E1 | ○ | ○ | ○ | ○ | 930 | 16 | 29 | 0 | 73 | 27 | 0 | ○ |
| E2 | ○ | ○ | ○ | ○ | 986 | 19 | 31 | 0 | 78 | 22 | 0 | ○ |
| E3 | ○ | ○ | ○ | ○ | 980 | 15 | 25 | 0 | 64 | 36 | 0 | ○ |
| E4 | ○ | ○ | ○ | ○ | 1025 | 15 | 35 | 0 | 65 | 35 | 0 | ○ |
| E5 | ○ | ○ | ○ | ○ | 810 | 20 | 25 | 0 | 68 | 32 | 0 | ○ |
| E6 | ○ | ○ | ○ | ○ | 850 | 20 | 35 | 0 | 72 | 28 | 0 | ○ |
| E7 | ○ | ○ | ○ | ○ | 830 | 18 | 33 | 0 | 75 | 15 | 10 | ○ |
| C1 | ○ | x | ○ | ○ | 840 | 17 | 31 | 0 | 77 | 23 | 15 | x |
| C2 | ○ | ○ | x | ○ | 1000 | 13 | 35 | 0 | 67 | 33 | 0 | x |
| C3 | x | ○ | ○ | ○ | 790 | 21 | 26 | 0 | 66 | 34 | 0 | x |
| C4 | ○ | ○ | x | ○ | 880 | 15 | 24 | 0 | 61 | 39 | 0 | x |
| C5 | x | ○ | ○ | ○ | 780 | 20 | 36 | 0 | 67 | 33 | 0 | x |
| C6 | ○ | ○ | x | ○ | 980 | 19 | 32 | 0 | 50 | 50 | 0 | x |
| C7 | ○ | x | ○ | ○ | 820 | 20 | 32 | 30 | 50 | 20 | 0 | x |
| C8 | ○ | x | ○ | ○ | 825 | 19 | 33 | 0 | 90 | 10 | 0 | x |

As shown in Table 2, sample No. C1 showing that the area ratio of the third phase was 15% failed to pass the deflective strength assessment, and samples No. E1 to E7 each showing that the area ratio of the third phase was 10% or less passed all assessment categories including wear volume, deflective strength, fracture toughness, and corrosion resistance. That is, when requirement (1) in which "a total area of the binder phase (Ti—Mo phase) and the hard phase (TiC phase) is 90% or more of an area of the SEM observation field of view" was not satisfied, a desired sliding material was not produced.

Sample No. C3 showing that the area ratio of the Ti—Mo phase (binder phase) was 21% failed to pass the wear volume assessment, and samples No. E1 to E7 each showing that the area ratio of the Ti—Mo phase (binder phase) was 15% or more and 20% or less passed all assessment categories including wear volume, deflective strength, fracture toughness, and corrosion resistance. That is, when requirement (2) in which "a total area of the binder phase is 15% or more and 20% or less of the area of the SEM observation field of view" was not satisfied, a desired sliding material was not produced.

Further, samples No. C6 and C7 each showing that the total area of the Ti—Mo phase having a diameter of 10 μm or more and 50 μm or less determined on an assumption that the area of the Ti—Mo phase has a circular shape was 50% and sample No. C8 showing that the total area of the same was 90% failed to pass the fracture toughness or deflective strength assessments, and samples No. E1 to E7 each showing that the total area of the same was 60% or more and 80% or less passed all assessment categories including wear volume, deflective strength, fracture toughness, and corrosion resistance. Sample No. C6 shows that the total area of the Ti—Mo phase having a diameter of more than 50 μm determined on an assumption that the area of the Ti—Mo phase has a circular shape was 50%, and sample No. C7 shows that the total area of the Ti—Mo phase having a diameter of less than 10 μm determined on an assumption that the area of the Ti—Mo phase has a circular shape is 60% or more and 80% or less of the total area of the binder phase" and requirement (4) in which "in the binder phase, a total area of the binder phase having a diameter equivalent to less than 10 μm calculated on an assumption that an area of the binder phase has a circular shape is 20% or more and 40% or less of the total area of the binder phase" were not satisfied, a desired sliding material was not produced.

Moreover, sample No. C4 showing that the Mo concentration in the Ti—Mo phase was 24 wt % failed to pass the fracture toughness assessment, sample No. C5 showing that the Mo concentration in the Ti—Mo phase was 36 wt % failed to pass the wear volume assessment, and samples No. E1 to E7 each showing that the Mo concentration was 25 wt % or more and 35 wt % or less passed all assessment categories including wear volume, deflective strength, fracture toughness, and corrosion resistance. That is, when requirement (5) in which "a Mo concentration in the binder phase is 25 wt % or more and 35 wt % or less" was not satisfied, a desired sliding material was not produced.

Based on the above, when any one of requirements (1) to (5) is not satisfied, a desired effect is not obtained in at least one of the categories including wear volume, deflective strength, fracture toughness, and corrosion resistance. Therefore, it is necessary to satisfy all the requirements.

The ratio of the binder phase which is soft and the hard phase has an effect on the fracture toughness and the hardness, and there is a correlation between the hardness and the wear volume to a certain extent. As the ratio of the binder phase increases, the fracture toughness increases and the hardness decreases, and consequently the wear volume increases. The Mo concentration in the Ti—Mo phase also has an effect on the fracture toughness and the hardness. A too low Mo concentration reduces an amount of the Ti—Mo phase strengthened by solid solution strengthening, which reduces the fracture toughness and the hardness and increases the wear volume. A high Mo concentration increases the fracture toughness and the hardness and reduces the wear volume. However, as a too high Mo concentration deteriorates sintering properties, it is difficult for the Ti—Mo phase to obtain dense compositions.

The fracture toughness or the deflective strength is also used as an index to indicate fragility. Based on the results shown in Table 2, it is considered that a large or uneven-sized Ti—Mo phase leads to an ongoing increase in an abrasive wear volume caused by hard impurities in water, which makes a crack easily produced and therefore the material becomes more fragile. When hard particles in slurry hit a surface of the sliding material while sliding, although a crack is produced on the surface of the sliding material, fracture energy at the time is absorbed by plastic deformation of the Ti—Mo phase surrounded by the $TiC_x$ phase. Thus, if the Ti—Mo phase surrounded by the $TiC_x$ phase is large in some degree, this serves to prevent propagation of a crack on the surface of the sliding material caused by a slurry wear (wear caused by fluids containing hard particles). Accordingly, it is considered that development of a crack caused by fracture and wear is prevented and wear resistance performance is improved.

Based on the above, the fracture toughness and the hardness have a conflicting effect. However, a sliding material having compositions which satisfy all of requirements (1) to (5) was found to be able to have the wear resistance suitable for a sliding member even if a sliding material having a high hardness is not selected, in other words, even if the material having a high fracture toughness value is selected.

Example 2

Next, a bearing sleeve composed of the sliding material of sample No. E3, E4, E5, E6, C1, C2, or C3 was installed in a vertical shaft mixed flow pump (FIGS. 2 and 3), and an acceleration test in which seawater is discharged was conducted. That is, to create a rough operating environment, hard ceramics was used for the sliding bearing which is a corresponding sliding part of the sleeve, earth and sand were mixed as foreign objects in the same way as in the actual situation, and a start-and-stop motion was repeated to produce large vibrations. A thickness of the sleeve was made half the actually designed thickness, and the pump was operated with a rotational speed set at a normal rotational speed plus an additional 20%.

Each sleeve was installed and the start-and-stop motion of the water-discharge operation was repeated the same number of times to observe the bearing sleeve. No breakage or crack was found on the bearing sleeve composed of the sliding material of sample No. E3, E4, E5, or E6, and also their wear volumes were perfectly acceptable. However, a formation of a crack was confirmed on the bearing sleeve composed of the sliding material of sample No. C1 or C2. Further, the crack was not found in sample No. C3, but its wear volume was significantly large.

Therefore, the pump incorporating a sleeve composed of the sliding member according to the present invention was confirmed to have good corrosion resistance and wear resistance as well as great resistance to breakage in any situations including a case where corrosive fluids such as seawater or sewage are handled, a case where a rotating shaft, which is adapted for a high lifting height and a large amount of pumping water, is long and the rotational speed is fast, and a case where a large amount of earth and sand and gravel get mixed into the pumping water.

What is claimed is:
1. A TiC—(Ti—Mo) sliding material comprising:
a binder phase made of a Ti—Mo alloy; and
a hard phase containing $TiC_x$ where x is in a range of 0.5 to 0.7,
wherein in a backscattered electron image by a scanning electron microscope (SEM) at a magnification of 400 times of the TiC—(Ti—Mo) sliding material in a field of view of 317 μm×220 μm, which are values converted from the number of pixels of the image observed by the SEM, the TiC—(Ti—Mo) sliding material satisfies all the following conditions (1) to (5):
   (1) a total area of the binder phase and the hard phase is 90% or more of an area of the field of view;
   (2) a total area of the binder phase is 15% or more and 20% or less of the area of the field of view;
   (3) in the binder phase, a total area of the binder phase having a diameter equivalent to 10 μm or more and 50 μm or less calculated on an assumption that an area of the binder phase has a circular shape is 60% or more and 80% or less of the total area of the binder phase;
   (4) in the binder phase, a total area of the binder phase having a diameter equivalent to less than 10 μm calculated on an assumption that an area of the binder phase has a circular shape is 20% or more and 40% or less of the total area of the binder phase; and
   (5) a Mo concentration in the binder phase is 25 wt % or more and 35 wt % or less.
2. The TiC—(Ti—Mo) sliding material according to claim 1 further comprising a third phase different from the binder phase and the hard phase in an amount of less than 10% of the area of the field of view by the SEM.
3. A sleeve composed of a TiC—(Ti—Mo) sliding material according to claim 1, comprising: a sliding bearing for supporting a rotating shaft of a rotating machine while sliding; and a fixing member for fixing the sliding bearing, wherein the sleeve is cylindrical form and provided on a surface of the rotating shaft at which the rotating shaft slides with the sliding bearing.
4. A pump comprising: an impeller; a rotating shaft for rotating the impeller; and a casing for fixing a sliding bearing supporting the rotating shaft while sliding, the casing surrounding the impeller and the rotating shaft,
   wherein the pump is provided with a sleeve in a cylindrical form composed of a TiC—(Ti—Mo) sliding material according to claim 1, the sleeve being fixed on a sliding face of the sliding bearing of the rotating shaft.

* * * * *